Patented May 19, 1931

1,805,912

UNITED STATES PATENT OFFICE

RICHARD HERZ, OF FRANKFORT-ON-THE-MAIN, AND WERNER ZERWECK, OF FECHENHEIM, NEAR FRANKFORT-ON-THE-MAIN, GERMANY, ASSIGNORS TO GENERAL ANILINE WORKS, INC., OF NEW YORK, N. Y., A CORPORATION OF DELAWARE

NEW DERIVATIVES OF ANTHANTHRONE AND PROCESS OF MAKING SAME

No Drawing. Application filed October 7, 1927, Serial No. 224,755, and in Germany October 13, 1926.

In U. S. Patent No. 1,646,290 a new process is described for manufacturing the 1-aminonaphthalene-8-carboxylic acid, which consists in acting with an alkaline acting agent on the 8-cyannaphthalene-1-sulfonic acid, and a method of isolating the 1-aminonaphthalene-8-carboxylic acid in form of its inner anhydride (naphthostyril).

We have found a process for manufacturing new derivatives of anthanthrone by starting from naphthostyril-sulfonic acids, obtainable by sulfonating naphthostyril. Our process consists in saponifying the naphthostyril-sulfonic acids to the corresponding sulfonic acid derivatives of 1-aminonaphthalene-8-carboxylic acid diazotizing these derivatives, treating these diazocompounds with reducing agents, converting the formed sulfonic acid derivatives of the 1.1'-dinaphthyl-8.8'-dicarboxylic acid by alkali fusion into the corresponding hydroxyderivatives, subjecting these to the action of acid condensing agents and treating finally the formed hydroxy-anthanthrones with alkylating agents.

The course of the reaction may be illustrated by the following scheme of formulas:

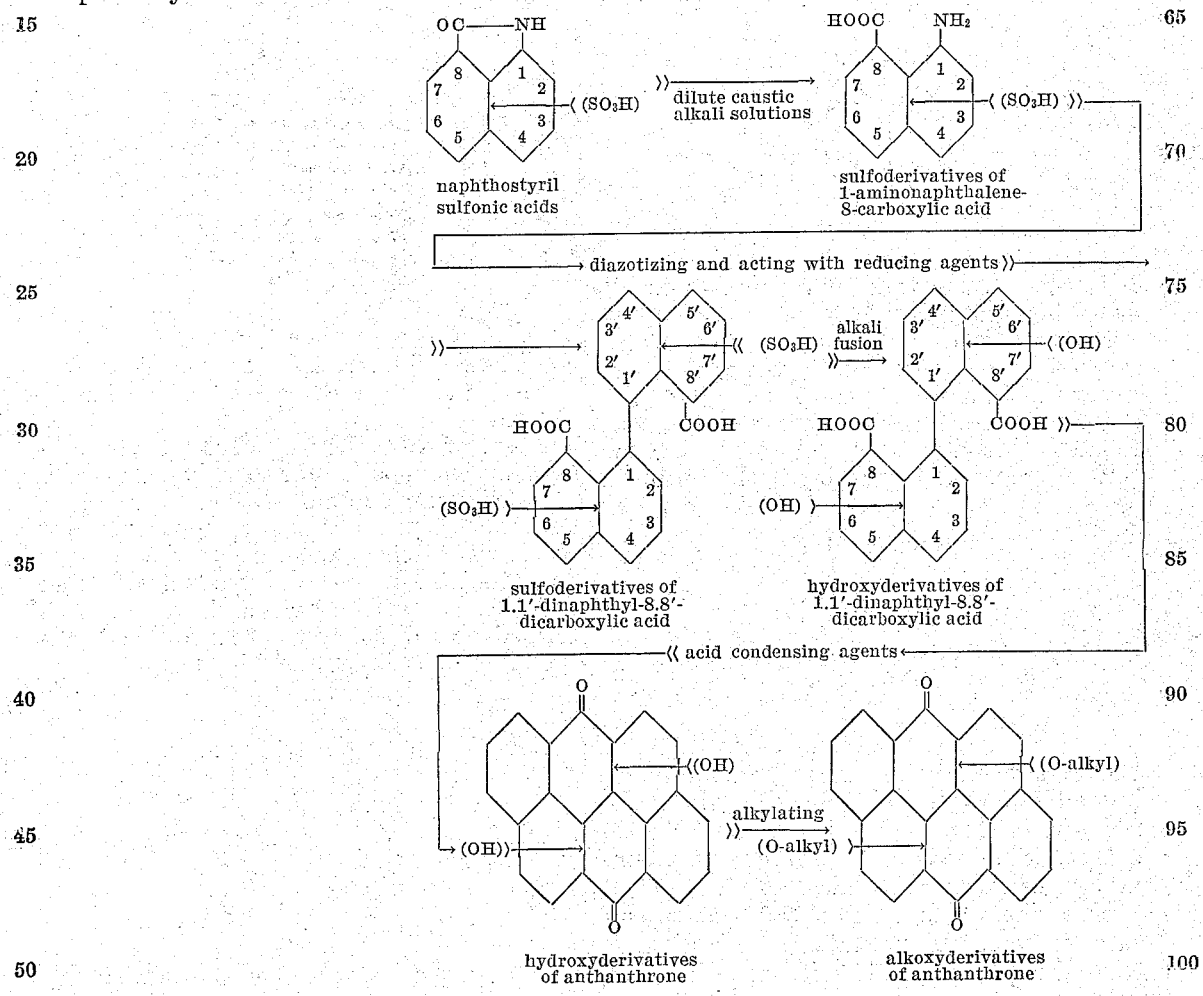

The hydroxyderivatives of anthanthrone, obtained as the last intermediates of our combined process, are also new compounds. The new alkoxyanthanthrones, obtained in a pure state with an excellent yield according to our invention and corresponding probably to the aforesaid formula, are when dry violet powders, soluble in concentrated sulfuric acid with a greenish color. They form with an alkaline hydrosulfite solution a reddish to bluish colored vat and dye cotton therefrom violet shades of a good fastness especially to light.

In order to further illustrate our invention the following example is given, the parts being by weight and all temperatures in Centigrade degrees. We wish it however to be understood, that we are not limited to the particular conditions nor to the specific products mentioned therein.

*Example*

169 parts of naphthostyril, see U. S. Patent No. 1,646,290, are sulfonated by warming it at about 90° with 100° parts of concentrated sulfuric acid; the mono-sulfonic acid thus formed corresponds probably to the formula:

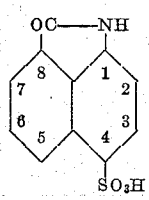

It is separated in form of its potassium salt by adding potassium chloride to the dilute mass of sulfonation. When warmed for instance with a caustic potash solution of 10% this potassium salt is easily converted into the potassium salt of the corresponding sulfonated 1-amino-naphthalene-8-carboxylic acid corresponding probably to the formula:

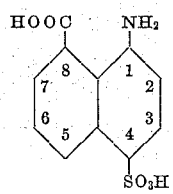

For transforming this acid in the corresponding dinaphthyl-disulfo-dicarboxylic acid, 267 parts of it are diazotized and the diazocompound is introduced at an ordinary temperature into an ammonical solution of cuprous oxide, prepared from 500 parts of sulfate of copper by means of sulfur dioxide. The dinaphthyl-disulfo-dicarboxylic acid, separating from the solution by acidifying, corresponds probably to the formula:

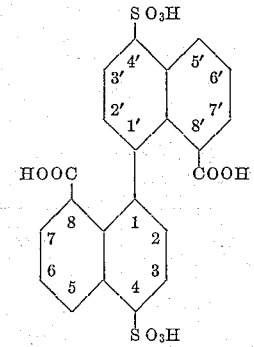

This step of our combined process is covered by U. S. Patent No. 1,684,272 of Herz and Zerweck, issued Sept. 11, 1928.

1 part of this dinaphthyl-disulfo-dicarboxylic acid is introduced at 140–150° into a molten mixture of 15 parts of caustic potash and 4 parts of water. The temperature of the mass is slowly increased to 180–190° and kept for some time. After cooling down the mass is diluted with water and by acidifying carefully with hydrochloric acid the formed dihydroxy-1.1′-dinaphthyl-8.8′-dicarboxylic acid of the probable formula:

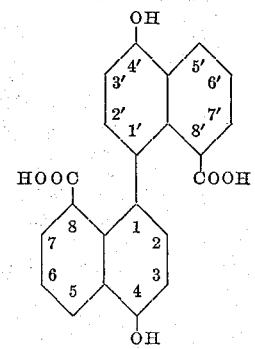

is isolated, filtered and washed with ice-water. It crystallizes from water in colorless crystals.

1 part of this dihydroxydinaphthyl-dicarboxylic acid is boiled for some hours with 10 parts of acetic acid anhydride and 1 part of anhydrous zinc chloride in an apparatus provided with a reflux condenser. After cooling down the mass the reaction product is filtered and washed with spirit and water. The formed new dihydroxy-anthanthrone corresponding probably to the formula:

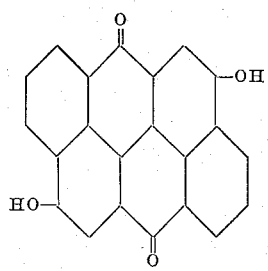

is when dry a brownish red powder, soluble in concentrated sulfuric acid with a yellowish green color, difficultly soluble in hot caustic alkali solutions with a greenish blue color. The alkaline hydrosulfite vat is bluish red colored.

1 part of this dihydroxyanthanthrone is mixed with a little amount of spirit and transformed into the greenish blue colored sodium salt by adding an equimolecular amount of caustic soda solution of 40° Bé. This sodium salt is filtered and heated at about 160–170° in a still moist condition while stirring with 100 parts of trichlorbenzene, 6 parts of carbonate of soda and 5 parts of para-toluenesulfonic acid methylester. The blue color of the mass turns to violet-red; after continuing the heating for some hours the mass is cooled down and the separated compact crystals are filtered and washed with spirit and water. The dimethoxyanthanthrone thus obtained corresponds probably to the formula:

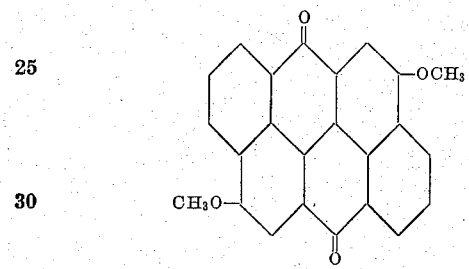

It is when dry a violet powder, soluble in concentrated sulfuric acid with a yellowish green color. From a bluish red hydrosulfite vat cotton is dyed the same shade, turning to a violet of an excellent fastness, especially to light, when exposed to the air or soaped. In the same manner the corresponding diethoxyanthanthrone is obtained.

We claim:

1. A process for producing new anthanthrone derivatives which process comprises saponifying a naphthostyril-sulfonic acid, corresponding probably to the formula:

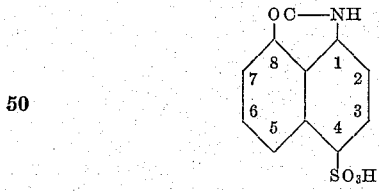

to the corresponding 1-aminonaphthalene-8-carboxy-mono-sulfonic acid diazotizing it, treating its diazocompound with reducing agents, converting the formed disulfonic acid derivative of 1.1′-dinaphthyl-8.8′-dicarboxylic acid by alkali fusion into the corresponding dihydroxyderivative, subjecting this to the action of acid condensing agents and treating finally the formed dihydroxyanthanthrone with alkylating agents.

2. As new compounds dialkoxyanthanthrones corresponding probably to the general formula:

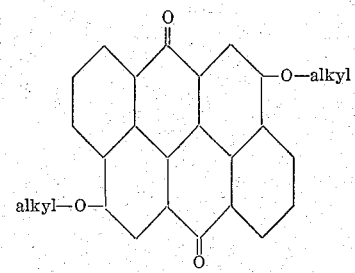

which compounds are when dry violet powders, soluble in concentrated sulfuric acid with a yellowish green color, forming with an alkaline hydrosulfite solution a bluish red vat, dyeing cotton therefrom the same shades, turning to a violet of an excellent fastness especially to light, when exposed to the air or soaped, which compounds are substantially identical with products obtainable by saponifying a naphthostyril-sulfonic acid, corresponding probably to the formula:

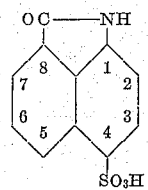

to the corresponding 1-aminonaphthalene-8-carboxy-mono-sulfonic acid diazotizing it, treating its diazocompound with reducing agents, converting the formed disulfonic acid derivative of 1.1′-dinaphthyl-8.8′-dicarboxylic acid by alkali fusion into the corresponding dihydroxyderivative, subjecting this to the action of acid condensing agents and treating finally the formed dihydroxyanthanthrone with alkylating agents.

3. As a new compound, dimethoxyanthanthrone corresponding to the formula:

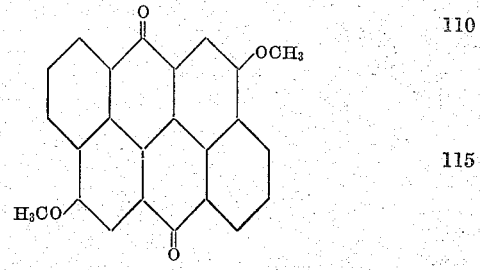

which compound is, when dry, a violet powder, soluble in concentrated sulfuric acid with a yellowish-green color, forming with an alkaline hydrosulfite solution a bluish-red vat, from which cotton is dyed bluish-red shades of an excellent fastness, especially to light, when exposed to the air or soaped.

In testimony whereof, we affix our signatures.

RICHARD HERZ.
WERNER ZERWECK.

CERTIFICATE OF CORRECTION.

Patent No. 1,805,912. Granted May 19, 1931, to

RICHARD HERZ ET AL.

It is hereby certified that error appears in the printed specification of the above numbered patent requiring correction as follows: Page 2, line 27, for the numeral and sign "100°" read 1000; and that the said Letters Patent should be read with this correction therein that the same may conform to the record of the case in the Patent Office.

Signed and sealed this 11th day of August, A. D. 1931.

(Seal)

Wm. A. Kinnan,
Acting Commissioner of Patents.